D. BLANDITI.
DRIVING CLUTCH FOR MAGNETOS.
APPLICATION FILED JAN. 31, 1916.
1,225,754.
Patented May 15, 1917.
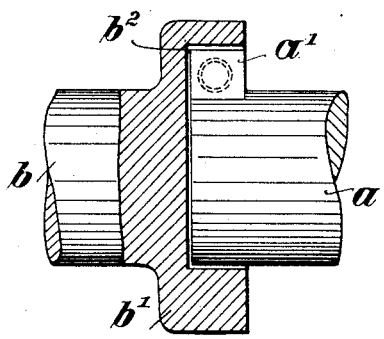
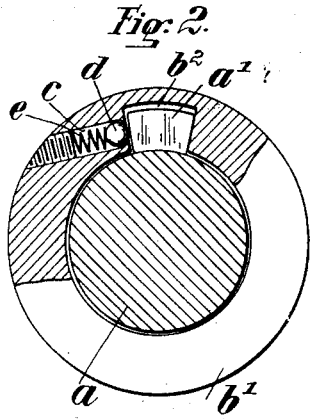
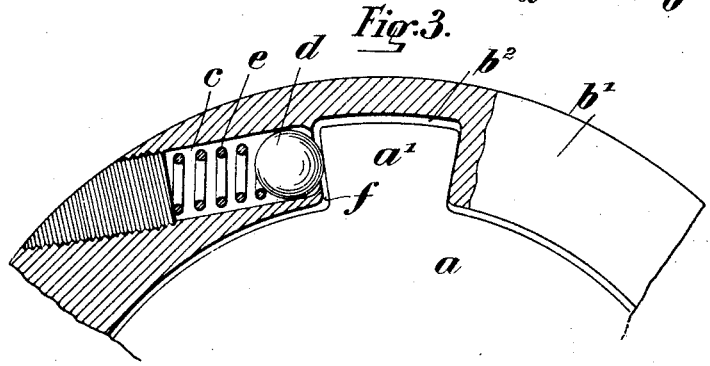
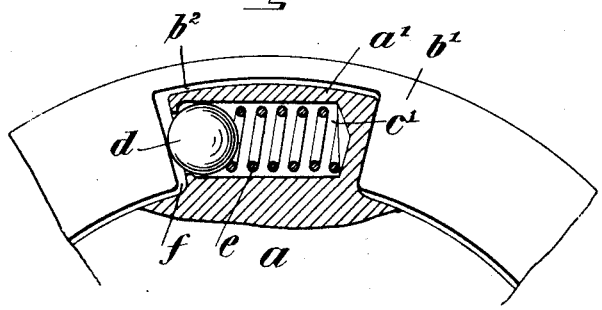
Inventor.
Duenzio Blanditi,
By [signature] Atty.

UNITED STATES PATENT OFFICE.

DECENZIO BLANDITI, OF ARBON, SWITZERLAND, ASSIGNOR TO THE FIRM ADOLPH SAURER, OF ARBON, SWITZERLAND.

DRIVING-CLUTCH FOR MAGNETOS.

1,225,754.  Specification of Letters Patent.  Patented May 15, 1917.

Application filed January 31, 1916. Serial No. 75,346.

*To all whom it may concern:*

Be it known that I, DECENZIO BLANDITI, a citizen of the Swiss Confederation, and residing at Arbon, Switzerland, have invented certain new and useful Improvements in Driving-Clutches for Magnetos, of which the following is a specification.

This invention relates to driving clutches for magnetos driven by motor-car engines and the like.

In a motor-car, the shaft of the magneto driven by the engine must be connected with the engine shaft in such a manner that the magneto can be readily removed and replaced without having to detach and join up screwed connections, such as screw-bolts and the like, and that in spite of its being frequently removed and replaced, whereby the shafts are thrown out of exact alinement, correct working of the ends of the shafts coupled together is assured. Heretofore, claw-clutches have been employed for the purpose mentioned, and for meeting the above requirements it is also well known to provide play between the two halves of the clutch; this play, however, has the disadvantage that when the direction of rotation of the driving member repeatedly changes, which is the case with magneto drives of the character referred to, the driving faces become spoilt.

A primary object of this invention is to provide an improved clutch of the type described which meets the above requirements and in which the above mentioned disadvantage is not present.

To this end, the suitably designed space constituting the play is wholly or partially filled up in such a manner by an elastic or spring-pressed member that the pressure of this intermediate member on one half of the clutch is always greater than the maximum force exerted for driving the armature shaft of the magneto.

Accordingly, the invention consists in the construction, arrangement and combination of parts described hereinafter and pointed out in the claims.

One illustrative embodiment of the invention and a modification thereof are represented by way of example in the accompanying drawing, wherein:—

Figures 1 and 2 show an improved claw-clutch in side and end sectional elevation, respectively, and Fig. 3 is a cross-section on an enlarged scale, while Fig. 4 shows a modified form of clutch in cross-section.

Referring to the drawing, the driving shaft $a$ has a claw $a^1$ on its end constituting the one member of a clutch, while the driven shaft $b$ carries the annular element $b^1$ having a recess $b^2$ constituting the other member of the clutch. The claw $a^1$ normally extends into the recess $b^2$, play being provided at $f$ between the wall of the recess and the one face of the claw, as clearly shown in Figs. 3 and 4. The two clutch members can be separated from one another by the movement of either member in an axial direction. According to the invention an elastic member, *e. g.* a coiled spring $e$, is provided in a bore or hole $c$ or $c^1$ made, respectively, either in the member $b^1$ (Figs. 1 to 3) or in the claw $a^1$ (Fig. 4) and opening at one end into the space $f$ constituting the play. In order to assure easier and more reliable working when the shafts are not in alinement, the outer end of the spring $e$ bears against a ball $d$ which is thereby pressed against the claw $a^1$ in the form shown in Figs. 1 to 3, or against the wall of the recess $b^2$ in the modified form shown in Fig 4. In both of these structures the rear end of the spring $e$ does not move on its seat, and the front end bearing against the ball is held in axial alinement by the ball. When the pressure holds the ball stationary against its opposed face there is sufficient space or play between the spring and the bore wall to permit one member of the clutch to move axially with respect to the other a slight amount without causing the ball to roll out of alinement with the axis of the spring. The play in the clutch is thereby taken up by the elastic member or the spring-pressed ball with a pressure exerted on the one half of the clutch which is greater than the maximum force exerted for driving the driven shaft.

It will be noted that the ball and spring are confined in a tubular recess $c$ or $c^1$, so that the spring always exerts pressure on the ball in the direction of the axis of the spring and its tubular recess. The ball and spring are also retained in their recess so that one member of the clutch may be removed from the companion member by simple axial movement, without removing either the ball or the spring from its recess and without danger of their falling out.

As shown in the drawing, the clutch may comprise only one claw, but if desired another claw may be provided diametrally opposite it, or more claws may be arranged around the periphery of the one shaft.

I claim:—

1. The combination with a shaft having a claw thereon constituting one member of a clutch, and an annular element having a recess for the reception of said claw and constituting the other member of said clutch, said clutch members being separable by axial movement of either member; of a spring and a ball retained in a bore in one of said members, said ball being urged by the spring to project from the bore against the driving face of the other member, said spring and bore coöperating to prevent the ball from rolling out of alinement with the axis of the spring during axial movement of said members.

2. The combination with a shaft having a radial claw thereon constituting one member of a clutch, and an annular element having a radially disposed recess therein and constituting the other member of said clutch, said clutch members being separable by axial movement of either member, said annular element having a bore opening into said recess; of a coil spring retained in said bore and arranged to exert pressure against said claw.

3. The combination with a shaft having a radially disposed claw thereon constituting one member of a clutch, and an annular element having a radially disposed recess to receive said claw and constituting the other member of the clutch, said clutch members being separable by the axial movement of either member, one of said members having a bore opening at the driving face of the member; of a spring of less diameter than said bore, and a ball retained in said bore, said ball being urged by the spring to project from the bore against the driving face of the other member with a force at least equal to the driving pressure, whereby slight axial play of said members will not cause the ball to roll out of alinement with the axis of the spring.

4. The combination with a shaft having a radially disposed claw thereon constituting one member of a clutch, and an annular element having a radially disposed recess to receive said claw and constituting the other clutch member, said clutch members being separable by the axial movement of either member, and said annular member having a bore from its periphery to one of the faces of said recess; of a spring and a ball retained in said bore, said spring urging the ball to project from said bore and engage the claw.

5. The combination with a shaft having a radial claw thereon constituting one member of a clutch, and an annular element having a radially disposed recess therein for receiving said claw and constituting the other member of said clutch, said clutch members being axially separable, said annular element having a bore opening into said recess; of a coil spring in and of less diameter than said bore, a ball seated on one end of said spring and projecting from the end of the bore against one face of the claw, said spring exerting a pressure at least equal to the driving pressure.

In testimony whereof, I affix my signature in the presence of two witnesses.

DECENZIO BLANDITI.

Witnesses:
Frank Dimmke,
Emil Mehl.